United States Patent [19]

Hawkins et al.

[11] Patent Number: 4,809,320

[45] Date of Patent: Feb. 28, 1989

[54] DOOR SECURITY SYSTEM

[76] Inventors: Gary D. Hawkins, 1426 E. Mountain View Rd., #3, Phoenix, Ariz. 85020; Louis Commisso, 3807 N. 30th St., #22, Phoenix, Ariz. 85016

[21] Appl. No.: 82,374

[22] Filed: Aug. 6, 1987

[51] Int. Cl.$^4$ ............................................. H04M 1/60
[52] U.S. Cl. .................................... 379/167; 350/243; 350/319; 350/575
[58] Field of Search ....................... 379/167, 170, 176; 350/243, 319, 575; 49/171

[56] References Cited

U.S. PATENT DOCUMENTS

| | | | |
|---|---|---|---|
| 2,169,874 | 8/1939 | Hardt | 49/171 |
| 4,130,728 | 12/1978 | Grauel | 379/167 |
| 4,269,474 | 5/1981 | Kamimura | 350/575 |
| 4,273,956 | 6/1981 | Wolfe | 379/167 |
| 4,348,083 | 9/1982 | Kamimura | 350/575 |
| 4,584,436 | 4/1986 | Boenning et al. | 379/167 |

FOREIGN PATENT DOCUMENTS 2552154  9/1983  France ................... 379/167

*Primary Examiner*—Jin F. Ng
*Assistant Examiner*—David H. Kim
*Attorney, Agent, or Firm*—James H. Phillips

[57] ABSTRACT

A security intercommunication system is disclosed which includes an inside housing, an outside housing and a peep-hole optical assembly including a cylindrical body having first and second threadedly engagable, longitudinally aligned sections. The inside housing contains electronic apparatus including an inside speaker/microphone unit, an amplifier having an adjustable input and an output, a battery, an on/off switch and a talk/listen switch. The outside housing contains an outside speaker/microphone unit. Each of the first and second housings are provided with mounting apertures in order that the inside and outside housings may be secured, respectively, on the inside and outside surfaces of the door by passing the sections of the optical assembly cylindrical body through the apertures and into a borehole through the door and screwing the cylindrical body sections together. During the mounting process, a conductor connected to the outside speaker/microphone unit is passed through the borehole to the electronic apparatus situated in the inside housing. The talk/listen switch is incorporated into the electronic apparatus such that when it is in a first position, a person on the inside of the door can hear sounds from the outside of the door picked up by the outside/speaker microphone unit and, when it is in a second position, the person inside the door can speak into the inside speaker/microphone unit whereby the sound is conveyed to the outside speaker/microphone unit.

2 Claims, 1 Drawing Sheet

U.S. Patent
Feb. 28, 1989
4,809,320
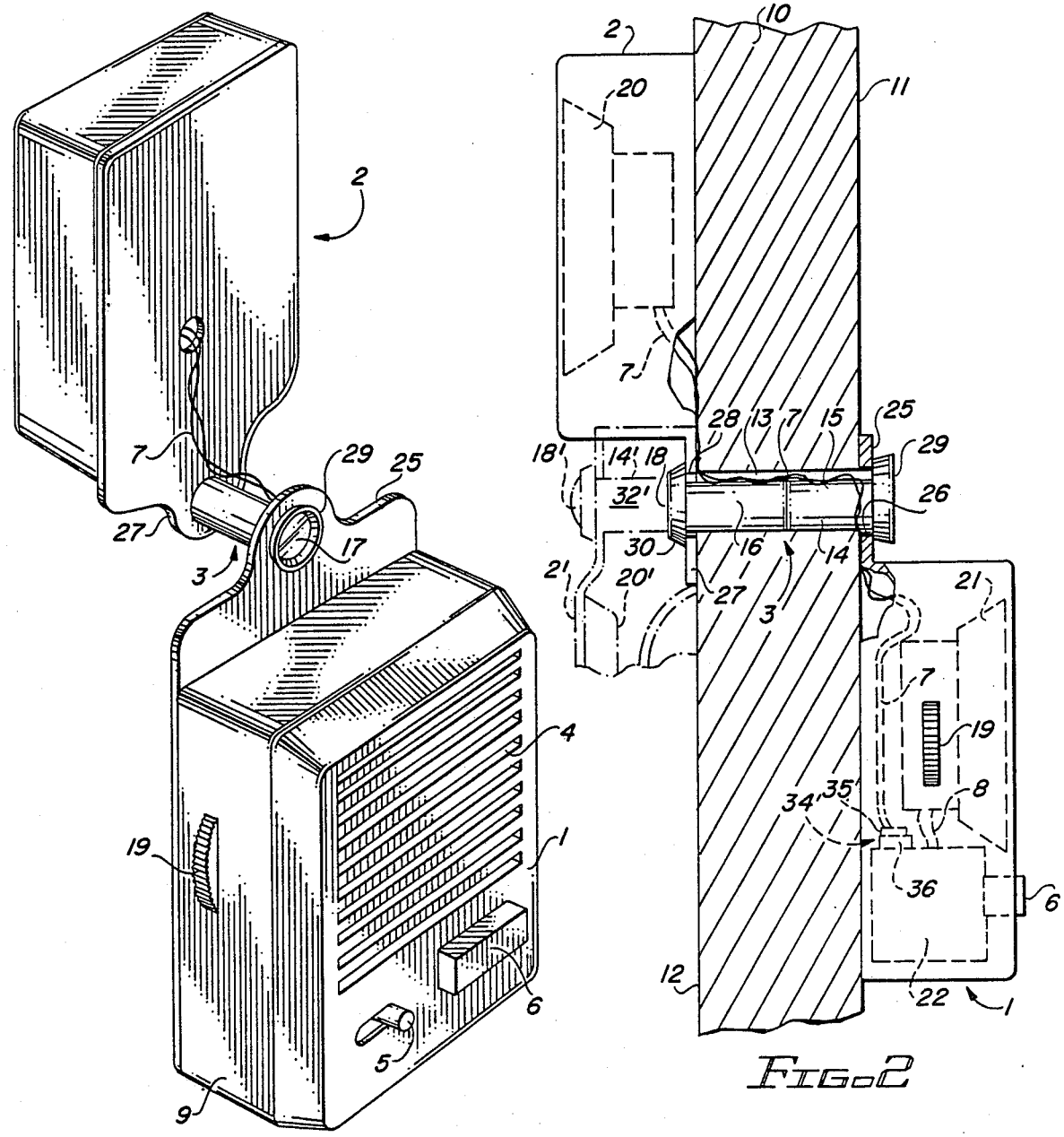
Fig. 1
Fig. 2
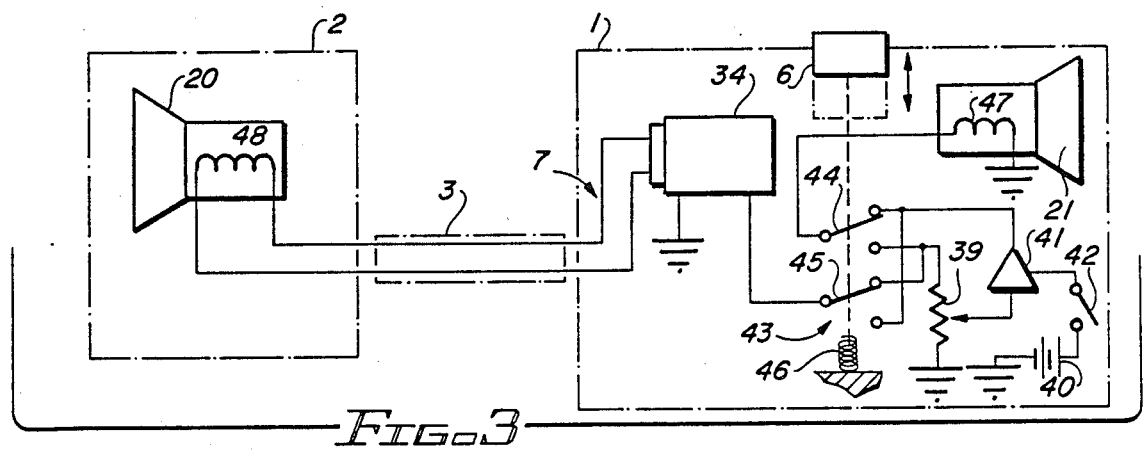
Fig. 3

DOOR SECURITY SYSTEM

FIELD OF THE INVENTION

This invention relates to the security arts and, more particularly, to a security intercommunication system for providing visual and aural information to a person situated on a first side of a closed door with respect to a person situated on a second side of the door.

BACKGROUND OF THE INVENTION

The need to effectively provide information to a person within a home or other structure pertaining to a person outside a locked entry door to the home or other structure is notoriously well-known. Because of security considerations, the person within may wish to both see the person outside the entry door and converse with the person before determining whether to admit the person through the door. Often, such entry doors are provided with supplementary locking devices (such as the well-known chain lock) which permit limited opening of the door to carry on such visual and aural inspection. Alternatively, a conventional "peep-hole" assembly may be provided which permits the viewer from within a more or less wide angle view of the exterior scene. Additionally, an aural intercommunication system may be provided from the interior of the home or other structure to the exterior of the entry door.

Those skilled in the security arts are well aware of the drawbacks of the "chain lock" devices, most particularly, their vulnerability to simple brute force unauthorized entry attempts. That is, a sufficiently heavy inwardly directed blow to an entry door will result in ripping the locks and related devices from the door and/or the door frame because the effect of the "chain lock" is only as strong as the cumulative effect of the fastening devices, typically wood screws, in the door and door frame. Similarly, peep holes, while useful, unless they provide a very wide angle view, often leave a region (outside the coneshaped field of view) in which an intruder may avoid inspection. With respect to intercommunication devices, all of these systems are useful, but they are typically expensive and are also difficult to install, usually requiring the services of a professional. Thus, those skilled in the security art will appreciate that it would be highly desirable to provide an integrated security intercommunication system for providing both visual and aural information to a person situated on the inside of a closed and locked door with respect to the scene on the outside of the door, which system is simple and inexpensive and may be easily installed by an unskilled person. It is to these ends that our invention is directed.

OBJECTS OF THE INVENTION

It is therefore a broad object of our invention to provide an improved security intercommunication system for providing visual and aural information to a person situated on a first side of a closed door with respect to the scene on a second side of the door.

It is another object of our invention to provide such a security intercommunication system which is simple and economical to manufacture.

In another aspect, it is another object of our invention to provide such a security intercommunication system which may be readily installed by an unskilled person.

SUMMARY OF THE INVENTION

Briefly, these and other objects of our invention are achieved by a security intercommunication system including an inside housing, an outside housing, a borehole through the entry door with which the system is to be employed, and a peephole optical assembly including a cylindrical body having first and second threadedly engagable, longitudinally aligned sections. The inside housing contains electronic apparatus including an inside speaker/microphone unit, an amplifier having an input (provided with a volume control) and an output, a battery, an on/off switch coupled to the battery and to the amplifier for selectively energizing the amplifier and a talk/listen switch having first and second positions. The outside housing contains an outside speaker/microphone unit. Each of the first and second housings are provided with mounting apertures of sufficient diameter as to pass the cylindrical body. As a result, the inside and outside housings may be secured, respectively, on the inside and outside surfaces of the door by separately passing the sections of the optical assembly cylindrical body through the mounting apertures and into the borehole through the door and then screwing the cylindrical body sections together such that the housings are supported by the optical assembly. During the mounting process, a conductor connected to the outside speaker/microphone unit is passed through the borehole to a plug/jack assembly included with the electronic apparatus situated in the inside housing. The optical assembly is preferably a wide-angle unit providing the inside viewer with a field of view of at least 160°, and the second housing is mounted such that, at least, the field of view to the sides and downwardly is unimpeded by the housing. The talk/listen switch is incorporated into the electronic apparatus such that, when it is in a first position, a person on the inside of the door can hear sounds from the outside of the door picked up by the outside/speaker microphone unit and, when it is in a second position, the person inside the door can speak into the inside speaker/microphone unit whereby the sound is conveyed to the outside speaker/microphone unit. The volume control selectively establishes the degree of amplification by the amplifier of the sensed sounds.

DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

FIG. 1 is a pictorial representation of the security intercommunication system shown assembled, but not yet incorporated into a door, in order to illustrate its general configuration;

FIG. 2 is a cross sectional view illustrating the system assembled to a door and also illustrating, in partial phantom, a variant configuration for an outside housing which is more easily installed; and FIG. 3 is a schematic diagram of a typical embodiment of the electronic components of the system.

DETAILED DESCRIPTION OF THE INVENTION

Referring now to FIG. 1, the system includes a first or inside housing 1, a second or outside housing 2 and a peephole optical assembly 3 which connects the housings 1 and 2. The inside housing 1 includes an outwardly facing louvered region 4 behind which there is situated a speaker/microphone unit as will be discussed in more detail below. A similar louvered region, out of view in FIG. 1, is provided in the outside housing 2. Also on the exterior of the inside housing 1 and typically positioned below the louvered region 4 is an on/off switch actuator 5 and a talk/listen switch actuator 6. Preferably, as will become more apparent from the discussion below, the talk/listen switch is a "push to talk" type such that the switch actuator 6 will be pressed inwardly to obtain the desired operation. It may be noted that a conductor pair 7 extends between the interior of the outside housing 2 to the interior of the inside housing 1 and passes adjacent the optical assembly 3 for reasons which will become more apparent below. Cover 9 is removable to permit access to the interior of the inside housing 1 during the system installation process as will be described in detail below. A volume control knob 19 projects through the side of the housing 1 for ready adjustment.

Consider now the more detailed structure presented in FIG. 2. In FIG. 2, the system is illustrated mounted to a door 10 having a first side 11 (the inside door face) on which the first housing 1 is situated and a second side 12 (the outside door face) on which the second housing 2 is situated. The optical assembly 3 extends through a borehole 13 through the door 12, the borehole extending from the first side 11 to the second side 12. The optical assembly 3 includes a cylindrical body 14 having first and second longitudinally aligned sections 15, 16 which are threadedly engagable. The peephole optical assembly also includes an inside lens (see FIG. 1) 17 coaxially disposed proximate the first end of the cylindrical body 14 and an outside lens 18 coaxially disposed proximate the outside end of the cylindrical body. Preferably, the optical properties of the optical assembly 3 provide an observer on the first door side with a field of view through the optical assembly of at least 160° of the scene on the second door side.

The outside housing 2 contains an outside speaker/microphone unit 20. Similarly, the inside housing 1 contains an inside speaker/microphone unit 21 and also electronic apparatus 22 to which the conductor pair 7 from the outside speaker/microphone unit 20 and another conductor pair 8 from the inside speaker/microphone unit 21 are coupled. In order to facilitate installation of the system, the conductor pair 7 terminates in a detachable plug 35 of a plug/jack assembly 34 which also includes jack 36 incorporated with the electronic apparatus 22. Those skilled in the art will appreciate that the plug/jack assembly may alternatively be situated in the outside housing 2.

A particular feature of the system is found in the fact that the inside housing 1 and the outside housing 2 are supported by the optical assembly 3. The manner in which this is achieved, in variant configurations, may be readily understood from FIG. 2. The inside housing 1 includes a tab 25 provided with a first mounting aperture 26 which is of sufficient diameter as to pass the cylindrical body 14 of the optical assembly 3. Similarly, the outside housing 2 is provided with a tab 27 having a second mounting aperture 28 also of sufficient diameter as to pass the cylindrical body 14. A first circumferential flange 29 extends outwardly from the inner end of the cylindrical body 14, and the diameter of the flange 29 is greater than the diameter of the first mounting aperture 26. Similarly, a second circumferential shoulder 30 extends outwardly from the outer end of the cylindrical body 14, and its diameter is greater than the diameter of the second mounting aperture 28 through the tab 27 of the outside housing 2.

The manner in which the entire system may be mounted to the door 12 will now be apparent. More particularly, the cylindrical body 14 of the optical assembly 3 may be separated into its two components by unthreading the sections 15, 16. First, the free end of the conductor pair 7 connected to the outside speaker/microphone unit 20 is passed through the borehole 13. Then, the outside section 16 of the cylindrical body 14 may be inserted through the mounting aperture 28 in the tab 27 until the shoulder of the flange 30 seats against the tab 27, and the outside section 16 may then be inserted into the borehole 13. Thereafter, inside section 15 may be inserted through the mounting aperture 26 in the tab 25 until the shoulder of the flange 29 engages the tab 25, and the section 15 may then be inserted into the borehole 13 until it abuts the outside section 16. Now, holding the outside housing 2 in the vertical position shown (generally above the optical assembly 3) and the inside housing 1 in the downwardly suspended position shown, the sections 15, 16 are screwed together. It will be noted that the conductor pair 7 resides in the clearance in the borehole 13 outboard the cylindrical body 14 and extends down into the inside housing 1 where the plug 35 is inserted into the jack 36, access being provided by temporarily removing the cover 9. If the plug/jack assembly resides in the outside housing, the installation sequence will be accordingly revised.

The reason that it is desirable to place the outside housing 2 in a position vertically above the optical assembly 3 is to permit a full field of view downwardly from the outside lens 18 and thereby prevent the creation of a blind spot where a person could crouch which would be the case if the housing 2 were suspended downwardly from the optical assembly 3 on the outside 12 of the door 10.

Alternatively, as shown in phantom in FIG. 2, with an optical assembly 3 which has the capability of accommodating the necessary extra length, a variant external housing 2' containing the external speaker/microphone unit 20', may be suspended downwardly with the position of the outside lens 18' being sufficiently outboard, even though the cylindrical body 14' extends through substantially the thickness of the outside housing 2', as to permit a full field of view in all directions. This configuration, which has the advantage that it is more easily installed, may be further facilitated by providing a reduced thickness region 32 of the outside housing 2'. It is only necessary that the lens 18' extend beyond the most outboard face of the housing 2' to obtain the desired field of view.

Referring now to FIG. 3, a battery 40 is incorporated within the inside housing 1 to selectively energize an amplifier 41 according to the position of an on/off switch 42 whose position is governed by the actuation of on/off switch actuator 5 (FIG. 1). A spring loaded double pole, double throw switch assembly 43 includes first contact set 44 and second contact set 45 as well as bias spring 46 and talk/listen switch actuator 6 (see also FIG. 1). Thus, it will be understood that pressure downward upon talk/listen switch actuator 6 against the bias spring 46 throws the contact sets 44, 45 from their normal positions shown in FIG. 3 to their alternative positions. In the normal position in which the on/off switch actuator 6 is not pressed, it will be seen that the voice coil 47 of the inside speaker/microphone unit 21 is coupled, through the contact set 44, to the output of amplifier 41. The voice coil 48 of the outside speaker/microphone unit 20 is connected, via the conductor pair 7, through plug/jack assembly 34, and through the contact set 45 to the input of amplifier 41. Thus, in the normal, unpressed position of the talk/listen switch actuator 6, any sounds sensed by the outside speaker/microphone unit 20 will be heard through the inside speaker/microphone unit 21 (assuming that the on/off switch 42 is in the "on" position). If a person operating the inside components of the system wishes to address anyone on the outside of the door 10 (FIG. 2), either after, before or during observation of the outside scene through the optical assembly 3, it is only necessary to press the talk/listen switch actuator 6 to throw the contact sets 44, 45 to their opposite positions in which the voice coil 47 of the inside speaker/microphone unit 21 is coupled to the input to amplifier 41, and the voice coil 48 of the outside speaker/microphone unit 20 is coupled to the output of amplifier 41.

Amplifier 41 may constitute any relatively small audio frequency unit such as a type LM-383 integrated circuit. Preferably, its wattage rating should be on the order of one watt or more in order that the outside speaker/microphone unit 20 can deliver substantial volume without undue distortion. Volume control 39, which is set by rotating the volume control knob 19 (FIG. 1), permits establishing the degree of amplification of the sensed sounds and is a particularly useful feature for the benefit of hearing impaired persons using the system.

It will be apparent from the foregoing discussion that the subject invention, in addition to being readily mounted to a door provided with a borehole for a conventional peephole optical assembly, can also be readily removed for subsequent mounting on another door. Thus, it is only necessary to reverse the mounting procedure by unplugging the plug/jack assembly 34 to free the inside end of the conductor pair 7 (after removing the cover 9 of the housing 1) and thereafter unscrewing the sections 15, 16 of cylindrical body 14 of the optical assembly 3 to pull the entire system apart until it is again mounted.

Thus, while the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

We claim:

1. A security intercommunication system for providing visual and aural information to a person situated on a first side of a closed door with respect to a person situated on a second side of the door, said system comprising:
   (A) a first housing;
   (B) a second housing;
   (C) a borehole through said door extending from said first side to said second side thereof;
   (D) a peephole optical assembly;
      1. said optical assembly including:
         a. a cylindrical body having first and second ends and first and second threadedly engagable sections;
         b. an inside lens coaxially disposed proximate said first body end; and
         c. an outside lens coaxially disposed proximate said second body end; and
      2. the optical properties of said optical assembly being selected to provide an observer on said first door side with a field of view through said optical assembly of at least 160° of the scene on said second door side;
   (D) mounting means for:
      1. removeably fixing said optical assembly in said borehole;
      2. securing said first housing in a position against said first door side such that said first housing is supported by said optical assembly; and
      3. securing said second housing in a position against said second door side such that said second housing is supported by said optical assembly;
      4. said mounting means further comprising:
         a. a first mounting aperture through said first housing, said first mounting aperture being of sufficient diameter as to pass said cylindrical body;
         b. a second mounting aperture through said second housing, said second mounting aperture being of sufficient diameter as to pass said cylindrical body;
         c. a first circumferential flange extending outwardly from said first cylindrical body end the diameter of said first circumferential flange being greater than the diameter of said first mounting aperture; and
         d. a second circumferential flange extending outwardly from said second cylindrical body end, the diameter of said second circumferential flange being greater than the diameter of said second mounting aperture;
         e. a first tab through which said first mounting aperture passes, said first tab being disposed at the top of said first housing; and
         f. a second tab through which said second mounting aperture passes, said second tab being disposed at the bottom of said second housing;
   whereby, said optical assembly and said first and second housings may be mounted to said door by passing said first cylindrical body section through said first mounting aperture and into said borehole from said first door side and by passing said second cylindrical body section through said second mounting aperture and into said borehole from said second door side and thereafter threading said first and second cylindrical body sections together such that said first housing is suspended downwardly from said first tab and said second housing is supported above said second tab to provide the full field of view below said second housing to a viewer on said first side of said door;
   (E) an outside speaker/microphone unit contained within said second housing;
   (F) electronic apparatus contained in said first housing said electronic apparatus including:
      1. an inside speaker/microphone unit;
      2. an amplifier having an input and an output;
      3. a battery;
      4. an on/off switch coupled to said battery and to said amplifier for selectively energizing said amplifier from said battery;

5. a talk/listen switch having first and second positions; and
6. a volume control connected to said amplifier input for establishing the degree of amplification of sensed sounds;

(G) conductor means connected to said outside speaker/microphone unit and to said talk/listen switch, said conductor means passing through said borehole external said optical assembly cylindrical body, said conductor means further including a plug and jack assembly such that said outside speaker/microphone unit may be detachably coupled to said electronic apparatus by inserting said plug into said jack;

and wherein:
(H) said talk/listen switch:
1. when in said first position, couples said outside speaker/microphone unit to said input of said amplifier and said inside speaker/microphone unit to said output of said amplifier; and
2. when in said second position, couples said inside speaker/microphone unit to said input of said amplifier and said outside speaker/microphone unit to said output of said amplifier.

2. A security intercommunication system for providing visual and aural information to a person situated on a first side of a closed door with respect to a person situated on a second side of the door, said system comprising:

(A) a first housing;
(B) a second housing;
(C) a borehole through said door extending from said first side to said second side thereof;
(D) a peephole optical assembly;
1. said optical assembly including:
a. a cylindrical body having first and second ends and first and second threadedly engagable sections;
b. an inside lens coaxially disposed proximate said first body end; and
c. an outside lens coaxially disposed proximate said second body end; and
2. the optical properties of said optical assembly being selected to provide an observer on said first door side with a field of view through said optical assembly of at least 160° of the scene on said second door side;
(D) mounting means for:
1. removeably fixing said optical assembly in said borehole;
2. securing said first housing in a position against said first door side such that said first housing is supported by said optical assembly; and
3. securing said second housing in a position against said second door side such that said second housing is supported by said optical assembly;
4. said mounting means further comprising:
a. a first mounting aperture through said first housing, said first mounting aperture being of sufficient diameter as to pass said cylindrical body;
b. a second mounting aperture through said second housing, said second mounting aperture being of sufficient diameter as to pass said cylindrical body;
c. a first circumferential flange extending outwardly from said first cylindrical body end, the diameter of said first circumferential flange being greater than the diameter of said first mounting aperture; and
d. a second circumferential flange extending outwardly from said second cylindrical body end, the diameter of said second circumferential flange being greater than the diameter of said second mounting aperture;
e. a first tab through which said first mounting aperture passes, said first tab being disposed at the top of said first housing; and
f. a diminished thickness region through which said second mounting aperture passes, said diminished thickness region being disposed proximate the top of said second housing;

whereby, said optical assembly and said first and second housings may be mounted to said door by passing said first cylindrical body section through said first mounting aperture and into said borehole from said first door side and by passing said second cylindrical body section through said second mounting aperture and into said borehole from said second door side and thereafter threading said first and second cylindrical body sections together such that said first housing is suspended downwardly from said first tab and said second housing is suspended downwardly from said diminished thickness region to provide the full field of view below said second housing to a viewer on said first side of said door;

(E) an outside speaker/microphone unit contained within said second housing;
(F) electronic apparatus contained in said first housing, said electronic apparatus including:
1. an inside speaker/microphone unit;
2. an amplifier having an input and an output;
3. a battery;
4. an on/off switch coupled to said battery and to said amplifier for selectively energizing said amplifier from said battery;
5. a talk/listen switch having first and second positions; and
6 a volume control connected to said amplifier input for establishing the degree of amplification of sensed sounds;
(G) conductor means connected to said outside speaker/microphone unit and to said talk/listen switch, said conductor means passing through said borehole external said optical assembly cylindrical body, said conductor means further including a plug and jack assembly such that said outside speaker/microphone unit may be detachably coupled to said electronic apparatus by inserting said plug into said jack;
and wherein:
(H) said talk/listen switch:
1. when in said first position, couples said outside speaker/microphone unit to said input of said amplifier and said inside speaker/microphone unit to said output of said amplifier; and
2. when in said second position, couples said inside speaker/microphone unit to said input of said amplifier and said outside speaker/microphone unit to said output of said amplifier.

* * * * *